(12) United States Patent
Tsou et al.

(10) Patent No.: US 7,095,004 B2
(45) Date of Patent: Aug. 22, 2006

(54) IMAGE SENSING MODULE CAPABLE OF FAST TRANSFERRING SIGNAL AND METHOD THEREOF

(75) Inventors: Ming-Chieh Tsou, Taipei Hsien (TW); Wen Hung Su, Pan Chiao (TW)

(73) Assignee: Lite-On Semiconductor Corporation, Hsin-Tien (TW)

(*) Notice: Subject to any disclaimer, the term of this patent is extended or adjusted under 35 U.S.C. 154(b) by 198 days.

(21) Appl. No.: 10/814,139

(22) Filed: Apr. 1, 2004

(65) Prior Publication Data

US 2005/0218293 A1 Oct. 6, 2005

(51) Int. Cl.
*H01L 27/00* (2006.01)
*H03F 3/08* (2006.01)

(52) U.S. Cl. ................ 250/208.1; 250/214 A

(58) Field of Classification Search ........... 348/230.1, 348/235, 249, 250, 307, 316, 300, 301, 241, 348/59, 126, 138; 250/208.1, 214 A
See application file for complete search history.

(56) References Cited

U.S. PATENT DOCUMENTS

2001/0008422 A1* 7/2001 Mizuno et al. ............ 348/302
2001/0025969 A1* 10/2001 Inui ........................... 257/225

* cited by examiner

*Primary Examiner*—Georgia Epps
*Assistant Examiner*—Don Williams
(74) *Attorney, Agent, or Firm*—Birch, Stewart, Kolasch & Birch, LLP

(57) ABSTRACT

An image sensing module capable of fast transferring signal and a method thereof are proposed. The image sensing module comprises an optical sensor set, a plurality of readout circuits and a plurality of amplifying circuits. Each readout circuit has a plurality of input terminals and an output terminal. Each amplifying circuit has an input terminal and an output terminal. The input terminals of each readout circuit are connected with the optical sensor set. The output terminal of each readout circuit is connected to the input terminal of one of the amplifying circuits. These readout circuits simultaneously capture output signals of the optical sensor set and then transfer to corresponding amplifying circuits in a parallel way. These amplifying circuits then output the amplified signals one by one in an orderly and time-sharing way to accomplish quick transmission of signals of the image sensing module.

10 Claims, 5 Drawing Sheets

IMAGE SENSING MODULE CAPABLE OF FAST TRANSFERRING SIGNAL AND METHOD THEREOF

FIELD OF THE INVENTION

The present invention relates to an image sensing module capable of fast transferring signal and a method thereof and, more particularly, to an image sensing module making use of optical signals for image detection.

BACKGROUND OF THE INVENTION

A contact image sensor (CIS) is a device which detects optical signals and converts them into readable electric signals. It is applied in image processing devices requiring electro-optical components for reading texts and pictures data such as scanners and copiers.

As shown in FIG. 1, after a document (not shown) is fed onto a transparent glass 73 through a transmission axis 71, a light source 79 will illuminate the document. The reflected light passes through a lenticular lens 75, which proportionally projects the reflected image onto a CIS chip 77 of a CIS module 70 in an identical ratio. The CIS chip 77 then detects the light signals to output electric signals in order.

The CIS module 70 is formed by series connecting several CIS chips 77 to match the size of a document to be read. That is, the larger the size of a document to be read, the more the CIS chips 77 used on the CIS module 70. The total length of the series-connected chips should be larger than the width of the document.

As shown in FIG. 2, a conventional image sensing module comprises an optical sensor set 81, a switch array 83, a shift array 0.85 and an amplifying circuit 87. In this embodiment, the resolution of the optical sensor set 81 is 600 dpi (dots per inch). In other words, the optical sensor set 81 includes 600 optical sensors D1~D600. The optical sensors D1~D600 can be photodiodes or phototransistors. The switch array 83 is composed of 600 switches, which are connected to the output terminals of the optical sensors one by one. The switch array 83 is used for controlling transmission of charge signals accumulated by the optical sensors. That is, after any optical sensor accumulates an enough charge energy, the corresponding switch will be on. The shift array 85 is composed of shift registers of the same number as the switches. The shift array 85 is used to respond to the input of a timing signal CK to control in order the activation of corresponding switches so that signals in the optical sensors can be outputted in order according to pixel positions.

The amplifying circuit 87 is connected to the output terminal of the shift array 85. The amplifying circuit 87 comprises an operation amplifier (op_amp), two switches SW1 and SW2, and a capacitor CL, and is used to amplify the output signal of the shift-array 85 for subsequent read and processing. The scanned image signals can thus be obtained.

For an existent CIS, the readout of signals is accomplished by accumulating sensed optical signals in optical sensors in charge form. The accumulated charges are then outputted one by one when outputting pixels. For the architecture shown in FIG. 2, the produced timing diagram is shown in FIG. 3. Through control of the on time of the switches SW1 and SW2, each charge signal outputted by the shift array 85 can be outputted and amplified in order, and a reset time (controlled by the switch SW2) is provided between adjacent charge signals. After the reset is finished, the next charge signal of the shift array 85 is then outputted.

When the signal of an existent CIS is read, charge signals obtained by detecting light using optical sensors are outputted one by one. The higher the resolution, the more the optical sensors used. Therefore, in order to completely output the charge signals of all the optical sensors, the required time is elongated. For the architecture of an existent image sensing module, if the speed of signal output is to be increased, one can raise the clock of the shift array to fast switch the conduction time of each optical sensor for outputting the charge signal.

Although shortening the conduction time of each optical sensor for outputting the charge signal can speed up the signal output of the image sensing module, there is still a bottleneck to completely output the charge signals accumulated by the optical sensors in such a short time due to the charging/recharging time of capacitor, which is further limited by the area size of the optical sensors and the detection capability in an unit time.

Accordingly, the present invention aims to provide an image sensing module capable of fast transferring signal and a method thereof to solve the above problems in the prior art.

SUMMARY OF THE INVENTION

An object of the present invention is to provide an image sensing module capable of fast transferring signal and a method thereof, which can simultaneously capture charge signals of several optical sensors to accomplish quick transmission of signals.

To achieve the above object, the present invention provides an image sensing module comprising an optical sensor set, a plurality of readout circuits and a plurality of amplifying circuits. The optical sensor set has a plurality of optical sensors used for receiving an optical signal and generating a plurality of corresponding charge signals. Each readout circuit has a plurality of input terminals and an output terminal. The input terminals of each readout circuit are connected with the optical sensors. The output terminals of the readout circuits output in order the charge signals received by the input terminals of the readout circuits. Each amplifying circuit has an input terminal and an output terminal. The input terminal of each amplifying circuit is independently connected to the output terminal of one of the readout circuits. The input terminal of each amplifying circuit receives and then amplifies one charge signal outputted in order by the output terminal of one of the readout circuits. The output terminals of the amplifying circuits then output in order the amplified charge signals.

To achieve the above object, the present invention also provides an image sensing method capable of fast transferring signal. This image sensing method comprises the steps of: providing m charge signals by detecting light; dividing said m charge signals into n sets of outputs in a discontinuous order; capturing said charge signals of each set at the same time; and outputting said captured charge signals in an orderly and time-sharing way.

The various objects and advantages of the present invention will be more readily understood from the following detailed description when read in conjunction with the appended drawing, in which:

DETAILED DESCRIPTION OF THE PREFERRED EMBODIMENTS

Figure 1:
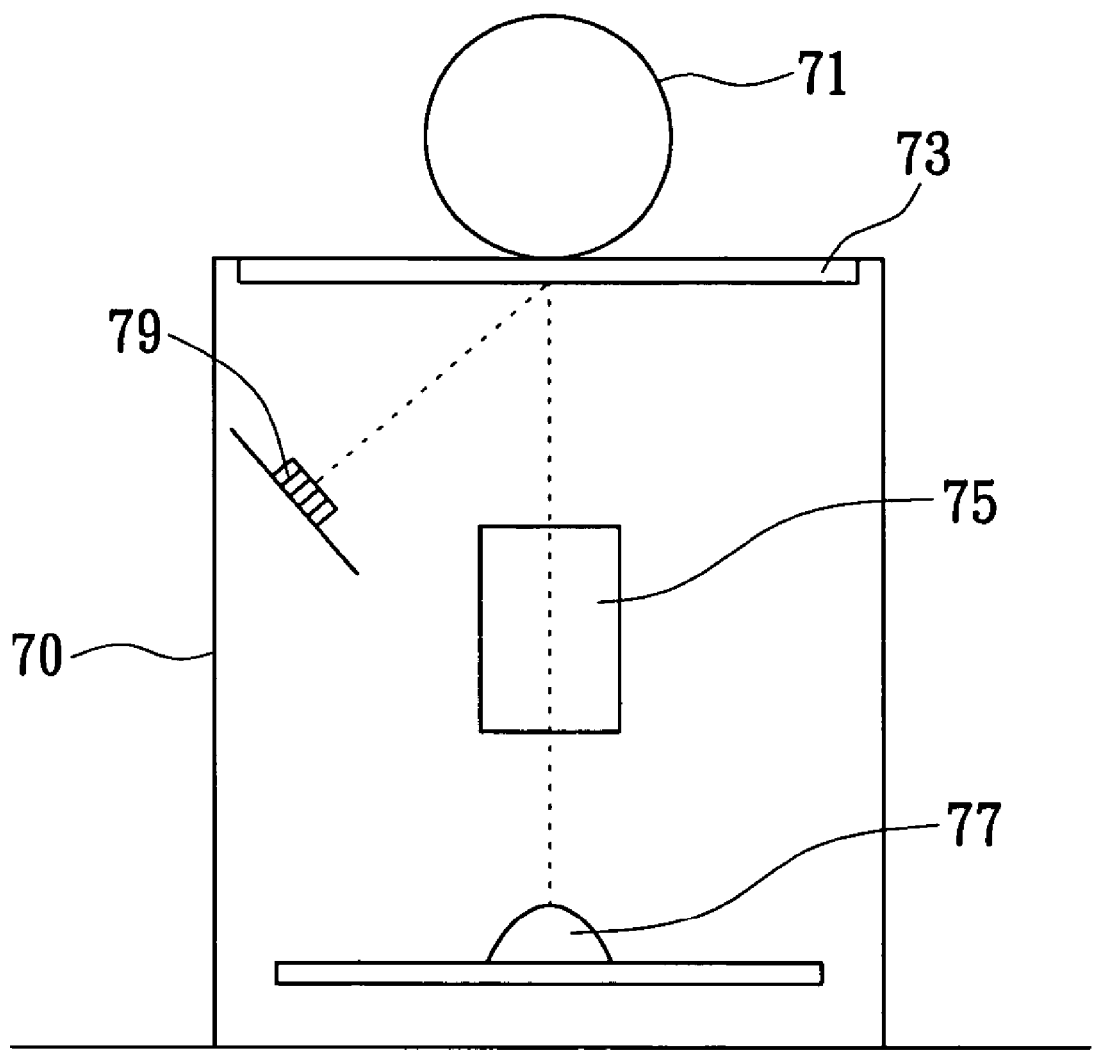
FIG. 1 is a cross-sectional view of a conventional CIS module.
Figure 2:
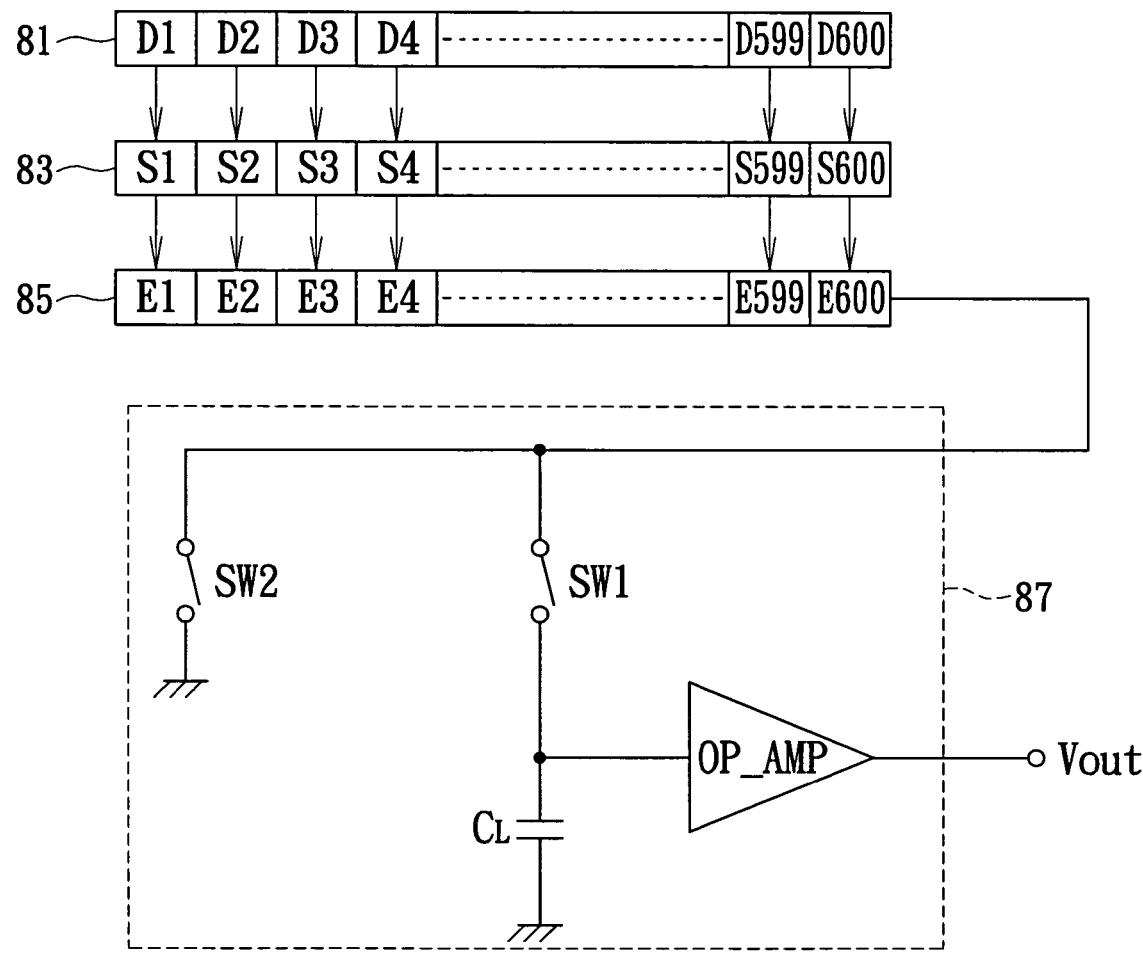
FIG. 2 is an architecture diagram of a conventional image sensing module.
Figure 3:
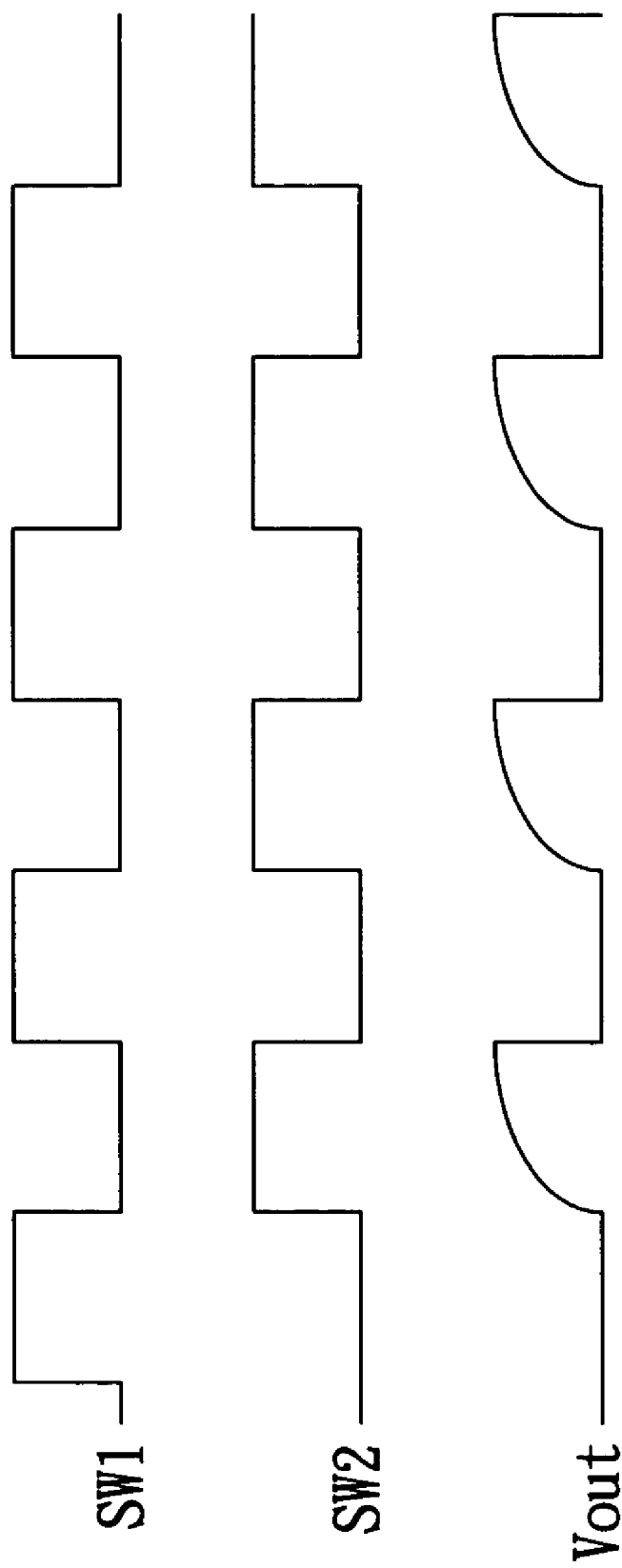
FIG. 3 is a timing diagram of a conventional image sensing module.
Figure 4:
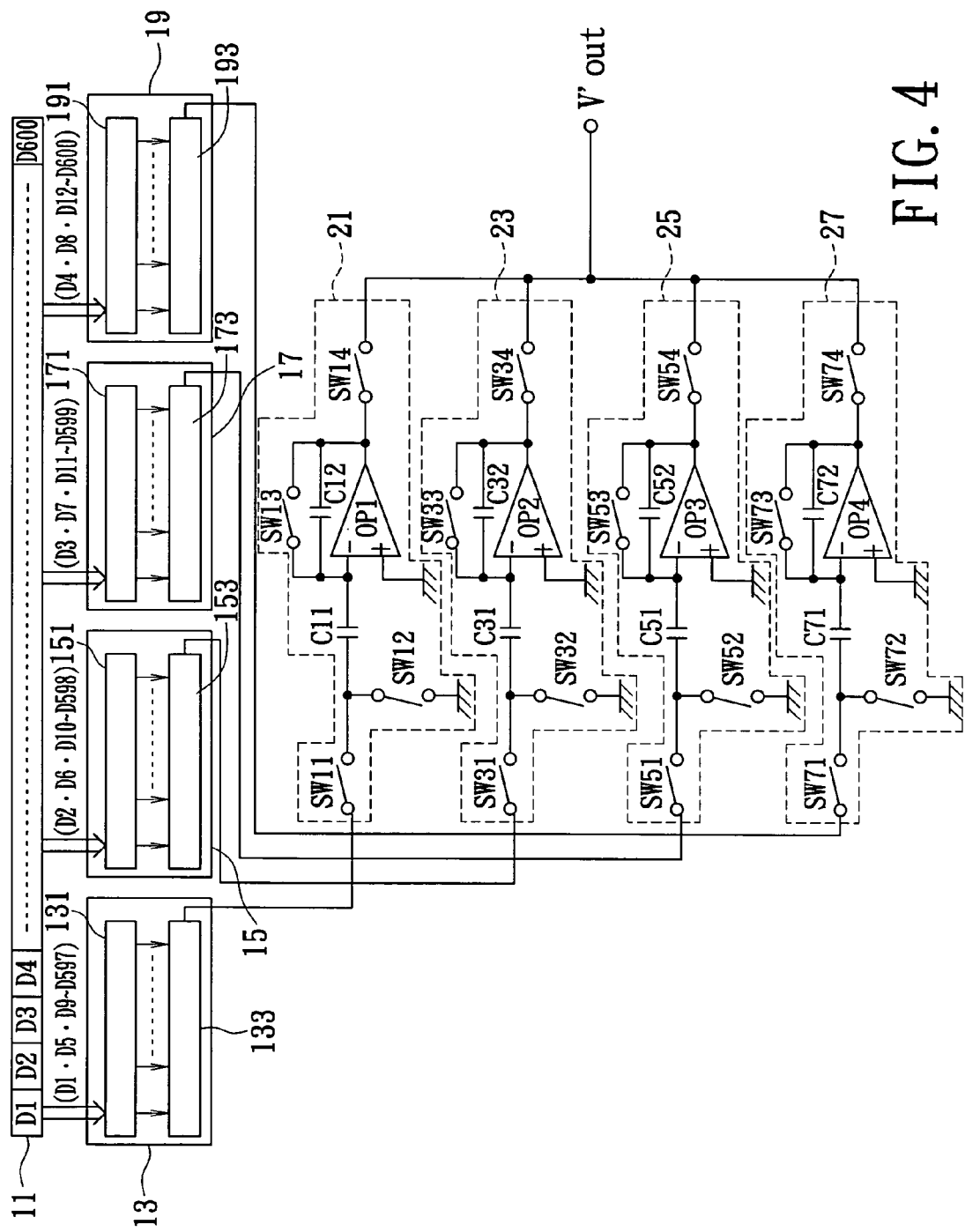
FIG. 4 is an architecture diagram of an image sensing module of the present invention.

As shown in FIG. 4, an image sensing module of the present invention comprises an optical sensor set 11, four readout circuits 13, 15, 17 and 19, and four amplifying circuits 21, 23, 25 and 27. In this embodiment, the optical sensor set 11 includes 600 optical sensors D1a~D600a. The optical sensors are photodiodes or phototransistors. These optical sensors are used to receive an optical signal obtained by detecting an image and then generate a plurality of corresponding charge signals.

The insides of the four readout circuits 13, 15, 17 and 19 have the same subassemblies and connection relationships, and each of them has a plurality of input terminals and an output terminal. For instance, the readout circuit 13 has a switch array 131 and a shift array 133. The switch array 131 is composed of 150 switches, which are connected to the output terminals of the optical sensors one by one. The arrangement order of the connected optical sensors is D1, D5, D9, . . . D597. These switches of the switch array 131 are used to control transmission of charge signals accumulated by the corresponding optical sensors. That is, after an optical sensor accumulates an enough charge energy, the corresponding switch will be on. The shift array 133 is composed 150 shift registers, which are connected to corresponding switches of the switch array 131 one by one. The shift array 133 is used to turn on in order the corresponding switches of the switch array 131 connected to the shift registers according to an input clock signal so that the charge signals of the optical sensors (D1, D5, D9, . . . D597) connected to the switches of the switch array 131.

Because the internal composition of the readout circuits 15, 17 and 19 is the same as that of the readout circuit 13, it won't be further described. The difference is in that the arrangement order of the optical sensors connected to a switch array 151 of the readout circuit 15 is D2, D6, D10, . . . D598, the arrangement order of the optical sensors connected to a switch array 171 of the readout circuit 17 is D3, D7, D11, . . . D599, and the arrangement order of the optical sensors connected to a switch array 191 of the readout circuit 19 is D4, D8, D12, . . . D600. The outputs of the optical sensor set 11 are divided into four equal parts by the four readout circuits 13, 15, 17 and 19. The arrangement order of the optical sensors connected to each part is discontinuous. This is an important characteristic of the present invention.

Please refer to FIG. 4 again. The insides of the four amplifying circuits 21, 23, 25 and 27 have the same subassemblies and connection relationships, and each of them has an input terminal and an output terminal. The input terminals of the amplifying circuits 21, 23, 25 and 27 are connected to the output terminals of the readout circuits 13, 15, 17 and 19, respectively.

The amplifying circuit 21 will be illustrated below. Because the internal composition of the amplifying circuits 23, 25 and 27 is the same as that of the amplifying circuit 21, it won't be further described. The amplifying circuit 21 includes a first switch SW11, a second switch SW12, a third switch SW13, a fourth switch SW14, an operation amplifier OP1, a first capacitor C11 and a second capacitor C12. A first terminal and a second terminal of the first switch SW11 are connected to the output terminal of the shift array 133 and a first terminal of the second switch SW12, respectively. A second terminal of the second switch SW12 is grounded. A first terminal and a second terminal of the first capacitor C11 are connected to the first terminal of the second switch SW12 and a negative input terminal of the operation amplifier OP1, respectively. A positive input terminal of the operation amplifier OP1 is grounded. A first terminal and a second terminal of the second capacitor C12 are connected to the negative input terminal and an output terminal of the operation amplifier OP1, respectively. A first terminal and a second terminal of the third switch SW13 are connected to the first and second terminals of the second capacitor C12, respectively. A first terminal of the fourth switch SW14 is connected to the output terminal of the operation amplifier OP1.

Besides, a first terminal of a first switch SW31 of the amplifying circuit 23 is connected to the output terminal of the shift array 153, a first terminal of a first switch SW51 of the amplifying circuit 25 is connected to the output terminal of the shift array 173, a first terminal of a first switch SW71 of the amplifying circuit 27 is connected to the output terminal of the shift array 193. Second terminals of the fourth switches SW14, SW34, SW54, SW74 of the amplifying circuits 21, 23, 25 and 27 are connected together.

The amplifying circuits 21, 23, 25 and 27 used in the present invention are switching capacitance amplifiers. The first switches SW11, SW31, SW51 and SW71 are used for sampling to provide guiding paths so that output signals of the shift arrays 133, 153, 173 and 193 can be stored in the first capacitors C11, C31, C51 and C71 on the series-connected path, respectively. Because the output paths of the shift arrays 133, 153, 173 and 193 are different, there may be offsets between their DC levels. Therefore, the first capacitors C11, C31, C51 and C71 in the present invention have also the capability of pulling the DC levels of the shift arrays 133, 153, 173 and 193 to the same level to avoid level offset of the output signals. Besides, the magnification provided by each of the amplifying circuits 21, 23, 25 and 27 is determined by the ratio of the capacitance value of the first capacitor to that of the second capacitor.

In the present invention, the capacitance values of the first capacitors C11, C31, C51 and C71 are larger than those of the second capacitors C12, C32, C52 and C72 to provide magnifications larger than 1 and thus compensate insufficient signal strengths transferred at high speeds for more convenient readability. During readout of the signals of the amplifying circuits 21, 23, 25 and 27, the first capacitors C11, C31, C51 and C71 will be destructively read and thus will be reset. Therefore, there will be no residual charge signals on the first capacitors C11, C31, C51 and C71 when the amplfying circuits 21, 23, 25 and 27 receive the next output signals of the shift arrays 133, 153, 173 and 193.

Besides, the first switches SW11, SW31, SW51 and SW71 and the third switches SW13, SW33, SW53 and SW73 of the amplifying circuits 21, 23, 25 and 27 have the same switching frequency and are synchronous, respectively. The output signals of the shift arrays 133, 153, 173 and 193 can thus be simultaneously sampled to the first capacitors C11, C31, C51 and C71. The second switches SW12, SW32, SW52 and SW72 and the fourth switches SW14, SW34, SW54 and SW74 of the amplifying circuits 21, 23, 25 and 27 have the same switching frequency and are synchronous, respectively. The second switches SW12, SW32, SW52 and SW72 of the amplifying circuits 21, 23, 25 and 27 have the same switching frequency but are not synchronous. The fourth switches SW14, SW34, SW54 and SW74 of the amplifying circuits 21, 23, 25 and 27 have the same switching frequency but are not synchronous. The amplifying circuits 21, 23, 25 and 27 can thus output the amplified signals in an orderly and time-sharing way.

The way of accomplishing fast transmission of signals will be described in detail below.

First, the readout circuits of the present invention are divided into four groups 13, 15, 17 and 19. The number of groups can vary according to practical necessity. A plurality of charge signals of the optical sensor set 11 obtained by detecting light can thus be divided into four parts and then outputted in parallel. There will be 150 charge signals that can be outputted by each part. The arrangement order of the optical sensors connected to each of the readout circuits 13, 15, 17 and 19 is discontinuous. The readout circuit 13 will output in order the charge signals of the optical sensors D1, D5, D9, . . . , D597. The readout circuit 15 will output in order the charge signals of the optical sensors D2, D6, D10, . . . , D598. The readout circuit 17 will output in order the charge signals of the optical sensors D3, D7, D11, . . . , D599. The readout circuit 19 will output in order the charge signals of the optical sensors D4, D8, D12, . . . , D600.

After synchronous clock signals are inputted to the shift arrays 133, 153, 173 and 193 of the readout circuits 13, 15, 17 and 19, the readout circuits 13, 15, 17 and 19 can simultaneously output the charge signals of the correspondingly connected optical sensors. That is, the readout circuits 13, 15, 17 and 19 will simultaneously output the charge signals of the optical sensors D1, D2, D3, D4, respectively. The next time, the readout circuits 13, 15, 17 and 19 will simultaneously output the charge signals of the optical sensors D5, D6, D7, D8, respectively. The readout circuits 13, 15, 17 and 19 will output the charge signals in this way until the charge signals of all the optical sensors have been outputted.

The amplifying circuits 21, 23, 25 and 27 correspondingly connected to the output terminals of the readout circuits 13, 15, 17 and 19 provide the functions of sampling and amplification. Through the control of switches in the amplifying circuits 21, 23, 25 and 27, the amplifying circuits 21, 23, 25 and 27 can simultaneously sample the charge signals outputted by the shift arrays 133, 153, 173 and 193 and then store them in the first capacitors C11, C31, C51 and C71, respectively. Next, the amplifying circuits 21, 23, 25 and 27 will amplify and output the sampled signals stored in the first capacitors C11, C31, C51 and C71 in an orderly and time-sharing way, respectively.

Figure 5:
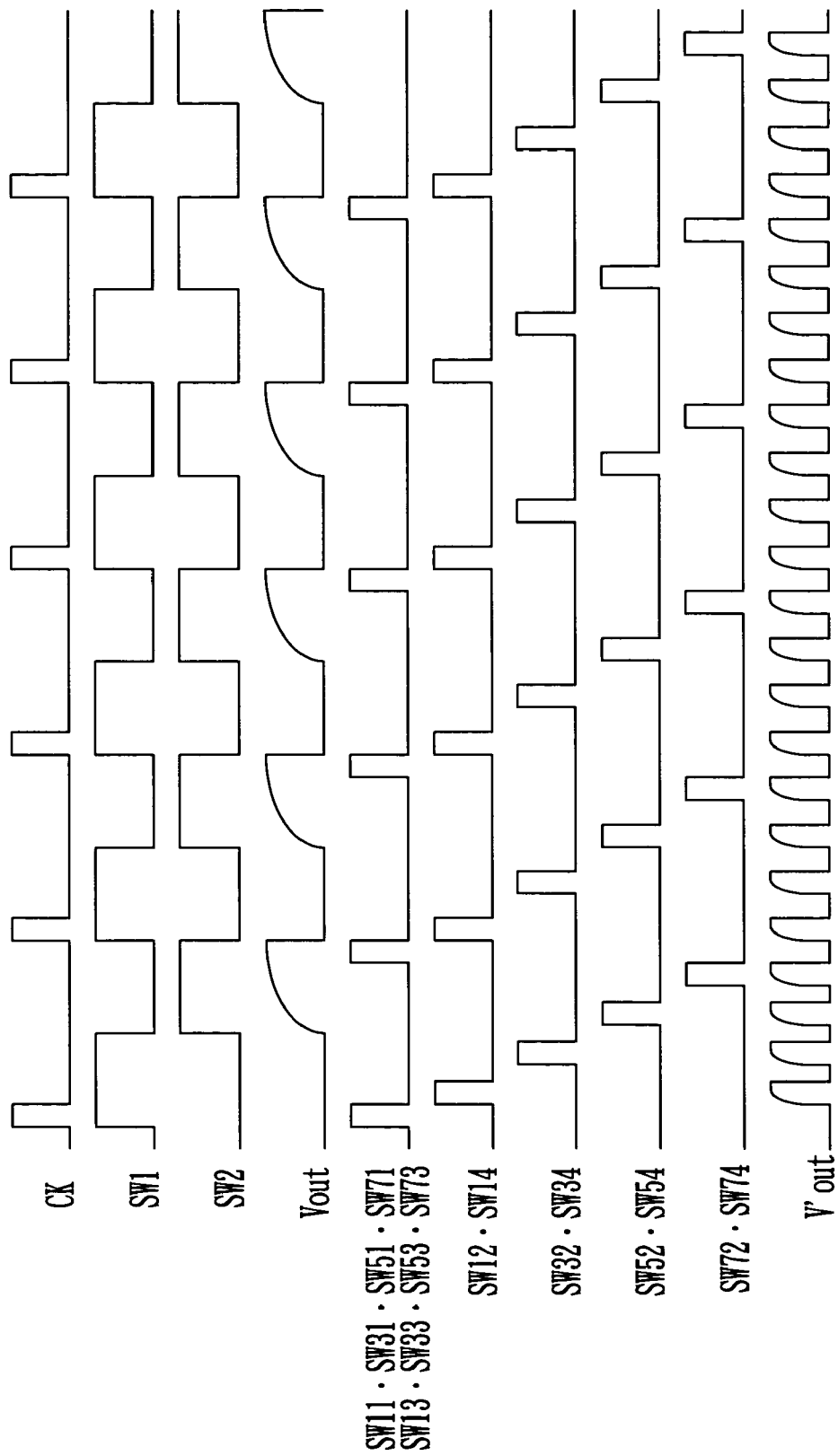
FIG. 5 is a timing diagram of an image sensing module of the present invention.

Please refer to FIG. 5, wherein CK represents a clock signal synchronously inputted to the shift arrays 133, 153, 173 and 193, SW1 and SW2 represents switching frequencies of a conventional sensing module, and Vout represents an output waveform of a conventional sensing module.

The way of accomplishing quick transmission of signals in the present invention will be illustrated for the period when each of the readout circuits 13, 15, 17 and 19 outputs a charge signal (i.e., a duty cycle of the clock signal CK). First, after the first switches SW11, SW31, SW51 and SW71 and the third switches SW13, SW33, SW53 and SW73 are on for a period of time, the second switch SW12 and the fourth switch SW14 of the amplifying circuit 21 are then simultaneously on for a period of time to output the amplified signal of the shift array 133. Next, the second switch SW32 and the fourth switch SW34 of the amplifying circuit 23 are simultaneously on for a period of time to output the amplified signal of the shift array 153. The second switch SW52 and the fourth switch SW54 of the amplifying circuit 25 are then simultaneously on for a period of time to output the amplified signal of the shift array 173. Finally, the second switch SW72 and the fourth switch SW74 of the amplifying circuit 27 are simultaneously on for a period of time to output the amplified signal of the shift array 193.

Please refer to FIG. 5 again. In the present invention, signals are outputted with a duty cycle of the clock signal CK as the unit time. The amplifying circuits 21, 23, 25 and 27 will circularly output the charge signals of all the optical sensors one by one. Moreover, in a duty cycle of the clock signal CK, there are four output signal V'out of the present invention as compared to only one output signal Vout in the prior art. Evidently, the present invention has a better transmission capability per unit time than the prior art.

To sum up, in the present invention, the amplifying circuits 21, 23, 25 and 27 are used to simultaneously capture four signals outputted by the shift arrays 133, 153, 173 and 193 and then output them in a speed four times that of the prior art. Therefore, the present invention can indeed accomplish quick transmission of detected image signals, and has output image signals with high strength.

Although the present invention has been described with reference to the preferred embodiment thereof, it will be understood that the invention is not limited to the details thereof. Various substitutions and modifications have been suggested in the foregoing description, and other will occur to those of ordinary skill in the art. For instance, the number of the readout circuits and the amplifying circuits is not limited to four. Moreover, the disclosed architecture can apply to image sensing devices such as CIS modules or CCD modules. Therefore, all such substitutions and modifications are intended to be embraced within the scope of the invention as defined in the appended claims.

We claim:

1. An image sensing module capable of fast transferring signal comprising:

an optical sensor set having a plurality of optical sensors, said optical sensors being used for receiving an optical signal and generating a plurality of corresponding charge signals;

a plurality of readout circuits each having a plurality of input terminals connected to a portion of said optical sensors and an output terminal, said output terminals of said readout circuits outputting in order said charge signals received by said input terminals; and a plurality of amplifying circuits, each of said amplifying circuits comprising:

an operation amplifier having a grounded first input terminal, a second input terminal and an output terminal;

a first switch having a first terminal and a second terminal, said first terminal being connected to said output terminal of one of said readout circuits;

a second switch having a first terminal connected to said second terminal of said first switch and a grounded second terminal;

a third switch having a first terminal connected to said second input terminal of said operation amplifier and a second terminal connected to said output terminal of said operation amplifier;

a fourth switch having a first terminal connected to said output terminal of said operation amplifier and a second terminal;

a first capacitor having a first terminal connected to said second terminal of said first switch and a second terminal connected to said second input terminal of said operation amplifier; and a second capacitor having a first terminal connected to said second input terminal of said operation amplifier and a second terminal connected to said output terminal of said operation amplifier;

whereby said input terminals of said amplifying circuits receive and amplify said charge signals outputted in order by said output terminals of said readout circuits, and said output terminals of said amplifying circuits then output said amplified charge signals one by one.

2. The image sensing module capable of fast transferring signal as claimed in claim 1, wherein said optical sensor is one of the photodiode and phototransistor.

3. The image sensing module capable of fast transferring signal as claimed in claim 1, wherein said input terminals of said readout circuits are connected to said optical sensors in a discontinuous way.

4. The image sensing module capable of fast transferring signal as claimed in claim 1, wherein each said readout circuit comprising:

a switch array having a plurality of switches correspondingly connected to said optical sensors; and a shift array having a plurality of shift registers correspondingly connected to said switches;

whereby said shift array turns on in order said switches connected to said shift registers to output in order said charge signals of said optical sensors connected to said switches.

5. The image sensing module capable of fast transferring signal as claimed in claim 1, wherein said second terminals of said fourth switches of said amplifying circuits are connected together.

6. The image sensing module capable of fast transferring signal as claimed in claim 1, wherein the capacitance of said first capacitor is larger than that of said second capacitor of each said amplifying circuit.

7. The image sensing module capable of fast transferring signal as claimed in claim 1, wherein said first switch and said third switch of each said amplifying circuit have the same switching frequency and are synchronous.

8. The image sensing module capable of fast transferring signal as claimed in claim 1, wherein said second switch and said fourth switch of each said amplifying circuit have the same switching frequency and are synchronous.

9. The image sensing module capable of fast transferring signal as claimed in claim 8, wherein said second switches of said amplifying circuits have the same switching frequency but are not synchronous.

10. The image sensing module capable of fast transferring signal as claimed in claim 8, wherein when said readout circuits output a charge signal, said second switches of said amplifying circuits will be on in order.

* * * * *